United States Patent Office 3,629,136
Patented Dec. 21, 1971

3,629,136
CALCIUM YTTRIUM SILICATE OXYAPATITE LASER MATERIAL CONTAINING HOLMIUM AND CHROMIUM IONS
Nathan T. Melamed, Pittsburgh, and George W. Roland and Richard H. Hopkins, Monroeville, Pa., assignors to Westinghouse Electric Corporation, Pittsburgh, Pa.
Filed Sept. 22, 1969, Ser. No. 859,754
Int. Cl. C09k 1/54; H01s 3/16
U.S. Cl. 252—301.4 F 3 Claims

ABSTRACT OF THE DISCLOSURE

A composition of matter which can be used as a laser crystal and which can be doped with Cr sensitizer ions has the empirical chemical formula $CaY_{4-x}(SiO_4)_3O:Ho_x$ where $x$ has a value from .001 to 1.

The invention herein described was made in the course of or under a contract or subcontract thereunder with the Department of the Air Force (Contract F33615-68-C-1129).

BACKGROUND OF THE INVENTION

Energy transfer from one fluorescent specie to another, or among fluorescent species of the same kind, is a fundamental process in luminescence. Before the advent of lasers, energy transfer was widely utilized in commercial phosphors, such as those used in fluorescent lamps to improve their efficiency, and was extensively studied in connection with organic phosphors.

With the advent of lasers, energy transfer processes have taken on additional importance as a means for improving the efficiency of optically pumped lasers. The work on fluorescent lamps was concerned mainly with the transfer of energy between transition metal ions of different types. In contrast, investigations on laser materials have been principally concerned with energy transfer from transition metal ions to rare-earth ions or energy transfer from rare-earth to rare-earth ions.

The basic aim of laser energy transfer can be described as follows: given an ion which has desirable spectroscopic properties (i.e., it emits in a desirable frequency region with a suitable bandwidth, etc.) but which is only a weak or inefficient absorber of the excitation energy, one must find another ion which has desirable absorption properties and which can transfer its energy efficiently and rapidly to the emitting ion. The emitting ion is called the activator or lasing ion and the absorbing ion is called the sensitizer. Energy transfer occurs from the sensitizer to the activator ion.

It has been demonstrated in U.S. Ser. No. 732,593, filed on May 28, 1968, and assigned to the assignee of this invention, that the mineral fluorapatite, $Ca_5(PO_4)F$, is an excellent laser host for sensitizer and/or activator ions. Suitably doped fluorapatite exhibits high gain and low threshold characteristics. Large single crystals of this doped material are prepared by Czochralski growth from stoichiometric melts at temperatures of about 1650° C.

Our invention relates to a composition of matter suitable as a laser crystal in a resonant cavity of a laser generator. This laser material is the silicate oxyapatite $CaY_4(SiO_4)_3O$ doped with holmium. Within the limits of our measurements, this material melts congruently at considerably higher temperatures (about 2080° C.) than fluorapatite. Although the existence and synthesis of some silicate oxyapatite powders generally has been disclosed, as for example by Jun Ito in 53 American Mineralogist 890; the growth, doping and laser application of large single crystals of our material has not been previously considered.

In addition to the crystalline laser material of this invention, other related laser materials are described in Westinghouse patent applications Ser. Nos. 859,672; 859,673; and 859,753, all filed on Sept. 22, 1969.

SUMMARY OF THE INVENTION

It is the object of this invention to provide a new and improved high strength composition of matter for use as a laser crystal in a resonant cavity of a laser generator.

This invention accomplishes the foregoing object by providing a crystalline material having the empirical formula:

$$CaY_{4-x-y}(SiO_4)_3O:Ho_x, Cr_y$$

where $x$ can vary between .001 to 1; and $y$ can vary between 0 to $(4-x)$ with a preferred range between 0 to 1.

Calcium, Ca, and yttrium, Y are considered host constituents. This is because they are not activators and play no role as sensitizer ions. Y is necessary to the construction of the host crystal lattice and is the prime constituent for which activator and sensitizer ions are substituted.

That $Ho^{+3}$ is the activator ion can be determined by measuring the frequency of the crystal laser oscillations and from known spectroscopic data. $Cr^{+3}$, which may be optionally present, is the sensitizing ion which will absorb energy from an energy pump source and transfer it to the activator ion, $Ho^{+3}$, which also absorbs energy from an energy pump source.

The laser material of this invention has low threshold characteristics and reasonably low gain, allowing improved energy storage. It also has the high material strength associated with high-melting-point compounds. This material provides a crystalline laser material capable of withstanding, without structural damage, significantly higher pumping energies than fluorapatite lasers.

BRIEF DESCRIPTION OF THE DRAWINGS

For a better understanding of the nature and objects of the invention, reference may be made to the following drawings in which.

and

Figure 6:
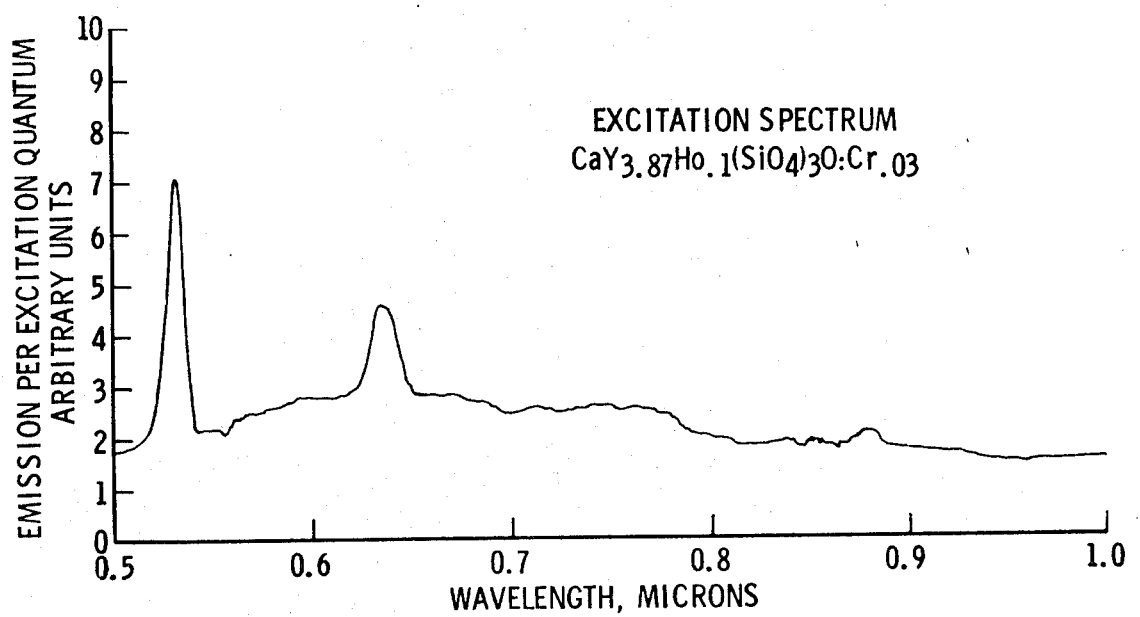

FIG. 6 shows the excitation spectrum of the infrared fluorescence from a polycrystalline sample of $$CaY_{3.87}Ho_{.1}(SiO_4)_3O:Cr_{.03}$$

DESCRIPTION OF THE PREFERRED EMBODIMENTS

The host material of this invention has the formula $CaY_4(SiO_4)_3O$. It contains ion sites which will accommodate both rare-earth and transition metal ions. The crystal structure of $CaY_4(SiO_4)_3O$ (where yttrium, Y, is a host constituent) is hexagonal with a unit cell formula of $Ca_2Y_8(SiO_4)_6O_2$. This host material has the apatite structure (space group $P6_3/m$). Two sets of $O^{-2}$ ions are present. One set is co-ordinated with $Si^{+4}$ in the $SiO_4$ tetrahedra and the other set occurs along the $c$ axis (two ions per unit cell) with each ion co-ordinated by three cations (calcium or yttrium) in the plane of the horizontal mirror (in $P6_3/m$.). Two types of cation sites are present ($Ca_I$ or $Y_I$ aind $Ca_{II}$ or $Y_{II}$). The Ho activator and/or Cr sensitizer ions can substitute for Y or Ca in the host material. This will be a substitution of some of the five Ca and Y cations in the host having the formula $CaY_4(SiO_4)_3O$.

The ion concentration of $Ho^{+3}$ can vary in the host from about .020 to 20 atom percent of the five cations (one Ca and four Y) in the host. The preferred range is from about .02 to 6 atom percent. Below the preferred range there is generally not enough optical absorption and above the preferred range there is usually serious concentration quenching. Thus $x$ in the formula $CaY_{4-x}(SiO_4)_3O:Ho_x$ has a preferred value between .001 and .3, i.e. $(.001=x)/5$ cations equals .020 atom percent and $(.3=x)/5$ cations equals 6 atom percent. However, with improved flash sources for special applications it is useful to have the value of $x$ greater than .3.

Figure 1:
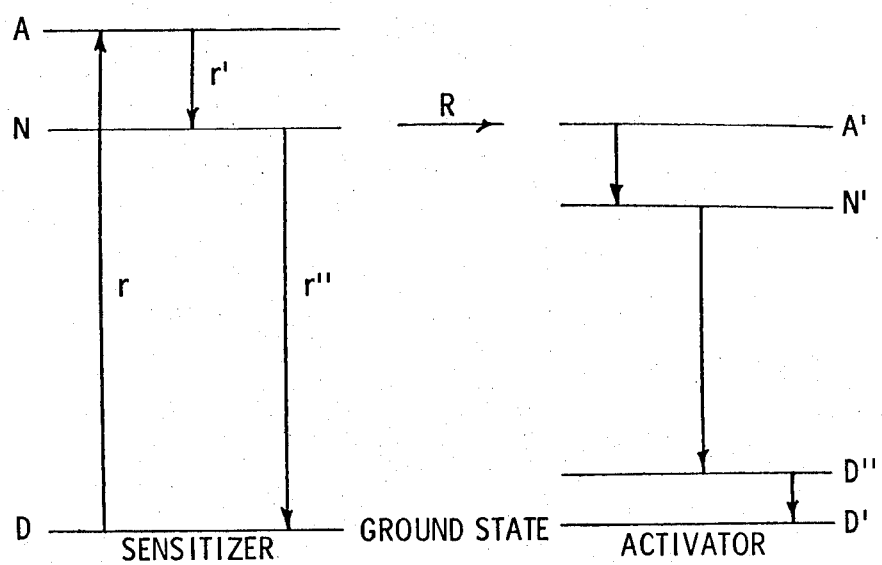
FIG. 1 shows energy levels of sensitizer and activator ions indicating transitions pertinent to energy transfer.

In accordance with this invention, $Cr^{+3}$ ions may be used to sensitize the rare-earth activator $Ho^{+3}$ ions in the host. Referring now to FIG. 1 which illustrates the various steps involved in non-radiative energy transfer: (1) The sensitizer ion absorbs a photon of external radiation of energy $r$, lifting it from the sensitizer ground state D to an excited state A. (2) The sensitizer decays to a lower metastable state N, by the emission of a photon $r'$ or by a non-radiative process. (3) Once lattice relaxation about the sensitizer metastable state has taken place, the sensitizer is either free to radiate a photon $r''$ or to transfer its energy to an activator ion, as indicated by R. (4) If the electronic transitions in both the sensitizer and activator are electric dipole transitions, the dipole field of the excited sensitizer can induce a dipole transition in a nearby activator, thereby raising the activator to an excited state A', with a simultaneous return of the sensitizer to its ground state. (5) This transition transfers a quantum of energy from the sensitizer to the activator. Once excited, the activator can decay to a lower metastable level N', through emission of photons, and can eventually decay to its ground state D' either directly or via an intermediate level D''. Reference may be made to D. L. Dexter, J. Chem. Phys., vol. 21, 1953, page 836 for detailed descriptions of these energy transfer processes.

The requirements in non-radiative transfer for efficient transfer of energy from sensitizer to activator are: (1) A reasonable overlap in energy between the sensitizer emission band and an absorption band of the activator. (2) High oscillator strengths in both sensitizer and activator. (3) A relatively high intrinsic radiative quantum efficiency for both the sensitizer and activator. In addition to the above criteria, there are several other criteria of a more general nature for a useful sensitizer. These are: (1) The sensitizer should absorb radiation in a spectral region where the activator has little or no absorption. (2) The sensitizer should absorb in a region where the pump lamp radiates appreciable energy, and (3) The sensitizer should not absorb where the activator emits, or have any adverse effects on the radiative efficiency of the activator. For efficient energy transfer to occur it is necessary that the rate of transfer (R in FIG. 1) be more rapid than the rate of decay of the sensitizer to its ground state ($r''$ in FIG. 1).

In the preparation of the laser crystalline material of this invention, 16.3610 grams of $CaCO_3$, 71.9872 grams of $Y_2O_3$, 3.0883 grams of $Ho_2O_3$ and 33.5635 grams of silicic acid were mixed together. All reactants were of luminescent grade (greater than 99.9% purity). The ingredients were then placed in an iridium crucible and melted at approximately 2080° C. as measured by an uncorrected optical pyrometer.

Crystals were pulled from the melt at about 2090° C. using the standard Czochralski technique, well known in the art and described in an article by J. Czochralski in Zeitschrift fur Physikalische Chemie, vol. 92, pages 219–221 (1918). A recent description of the process is found in an article by K. Nassau and L. G. Van Uitert in Journal of Applied Physics, vol. 31, page 1508 (1960).

The furnace was surrounded by a quartz cylinder attached to the apparatus by means of a neoprene gasket and a brass flange. Insulation for the iridium crucible was provided by a ½ inch thick zirconia quadrants stacked into a cylinder. Thermal distribution throughout the melt was controlled by adjusting the crucible in the field of the work coil and by changing spacing of the zirconia quadrants and the top plate. The power source was a Westinghouse 30 kva. motor-driven 10,000 cycle generator driving a water cooled copper work coil. The pulling apparatus was designed such that pull rates between 1 and 40 mm./hr. and rotation speeds of 10–170 r.p.m. could be used. Temperature was controlled by using the output of a sapphire light pipe leading to a radiamatic detector which fed the output into an L and N Azar recorder-controller. The voltage from the recorder-controller in association with an L and N current adjusting type relay supplied the input current of a Norbatrol linear power controller. The Norbatrol output voltage supplies the necessary field excitation required by the 10,000 cycle generator.

The seed was held on a water cooled shaft which was threaded to accommodate an iridium chuck. The crucible and chuck were protected from oxidation by an argon atmosphere. Oriented seeds were used for growth. These were obtained by starting with a polycrystalline seed obtained from a slow-cooled melt. Crystals were grown approximately ½ inch in diameter and 2 inches long. Cooling rates of the pulled crystals varied from two to six hours.

The crystalline materials that were grown are useful as laser crystal rods in simple lasers and in more complicated laser applications such as Q-switched lasers, both of which are described in detail in chapters 3 and 4 and especially pages 132–140 of The Laser by W. V. Smith and P. P. Sorokin, McGraw Hill, 1966, herein incorporated by reference.

Figure 2:
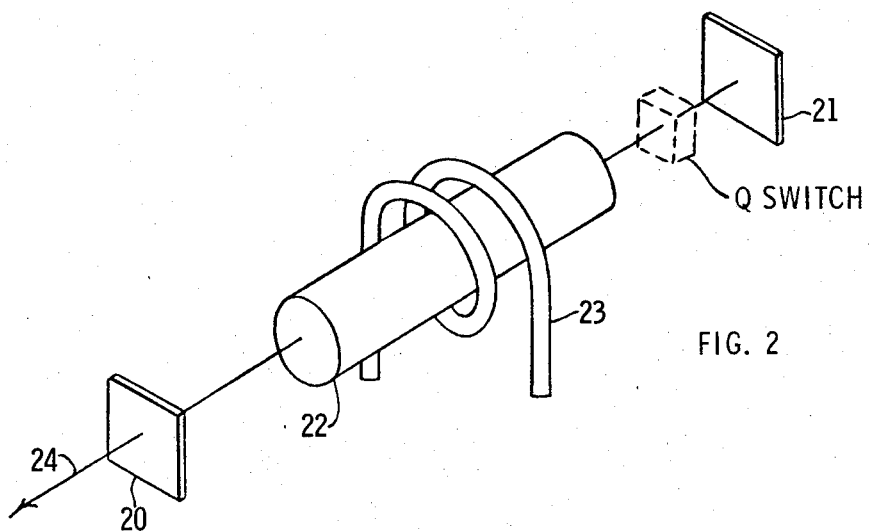
FIG. 2 shows a laser generator with a laser crystal in association with a radiation source in a resonant laser cavity.

A simple schematic illustration of a typical laser generator is shown in FIG. 2 of the drawings. Between reflectors 20 and 21 there is a resonant laser cavity containing the laser crystal 22, a radiation source means 23 such as a flash lamp which provides pump energy to the crystal and an optional Q-switching means shown by dotted lines. Reflector 20 is partially reflecting to permit the escape of light beams of coherent radiation 24 whereas reflector 21 is highly reflective.

The basic principle involved in Q-switching a laser is to allow a very high population inversion to be built up by making the laser cavity losses excessive, while the laser is being pumped, thereby preventing the laser from oscillating prematurely. When a strong inversion is attained, the conditions are suddenly made favorable for oscillation by rapidly making the cavity losses very small, so that a condition of large net amplification is suddenly realized. The Q-switch could, for example, contain a metallo-organic compound in solution such as a phthalocyanine which absorbs light from the crystal. The pumping energy input from the flash lamp increases until amplification in the laser crystal overcomes the loss due to absorption in the Q-switch cell and the laser begins to emit coherent light weakly. A very small amount of this light bleaches the solution which then becomes almost perfectly transparent to the light. At that instant there is suddenly a giant pulse of light containing all the stored energy in the laser rod.

Figure 3:
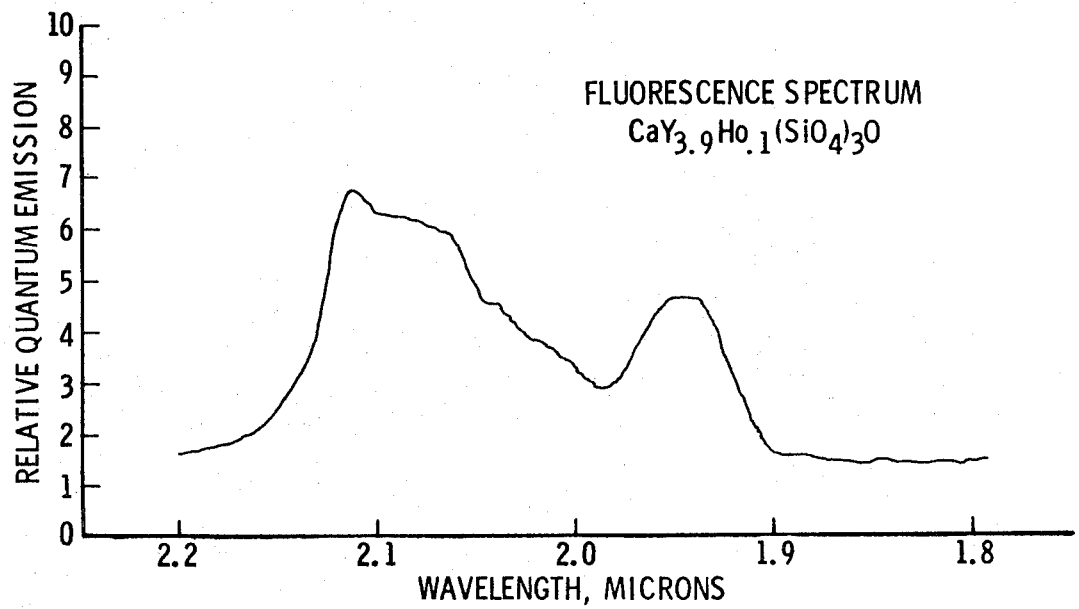
FIG. 3 shows the fluorescence spectrum of a polycrystalline sample of $CaY_{3.9}Ho_{.1}(SiO_4)_3O$.
Figure 4:
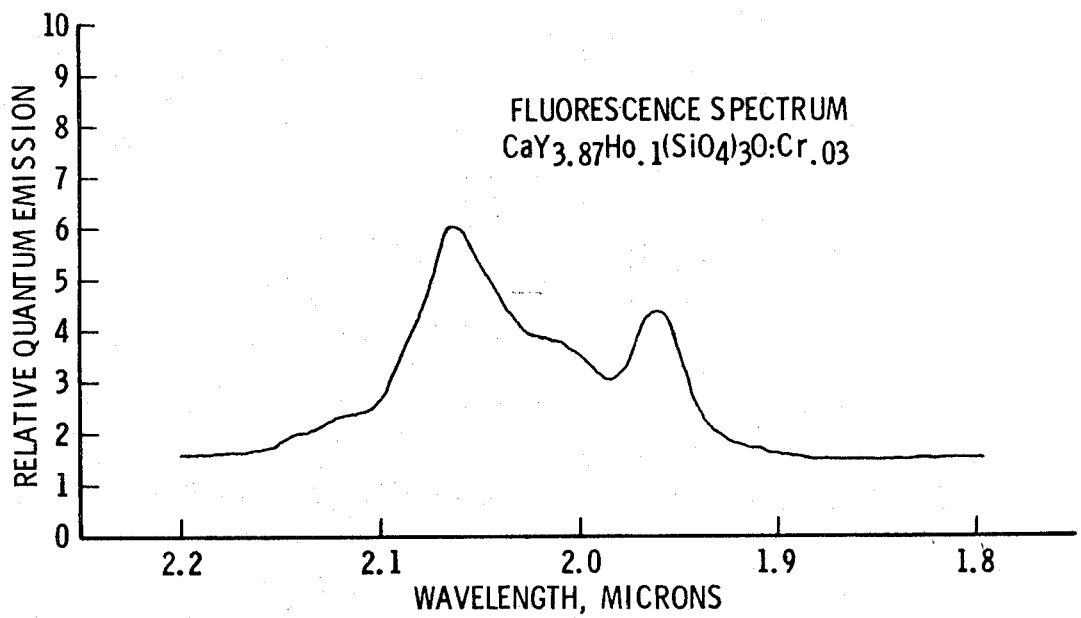
FIG. 4 shows the fluorescence spectrum of a polycrystalline sample of $CaY_{3.87}Ho_{.1}(SiO_4)_3O:Cr_{.03}$.
Figure 5:
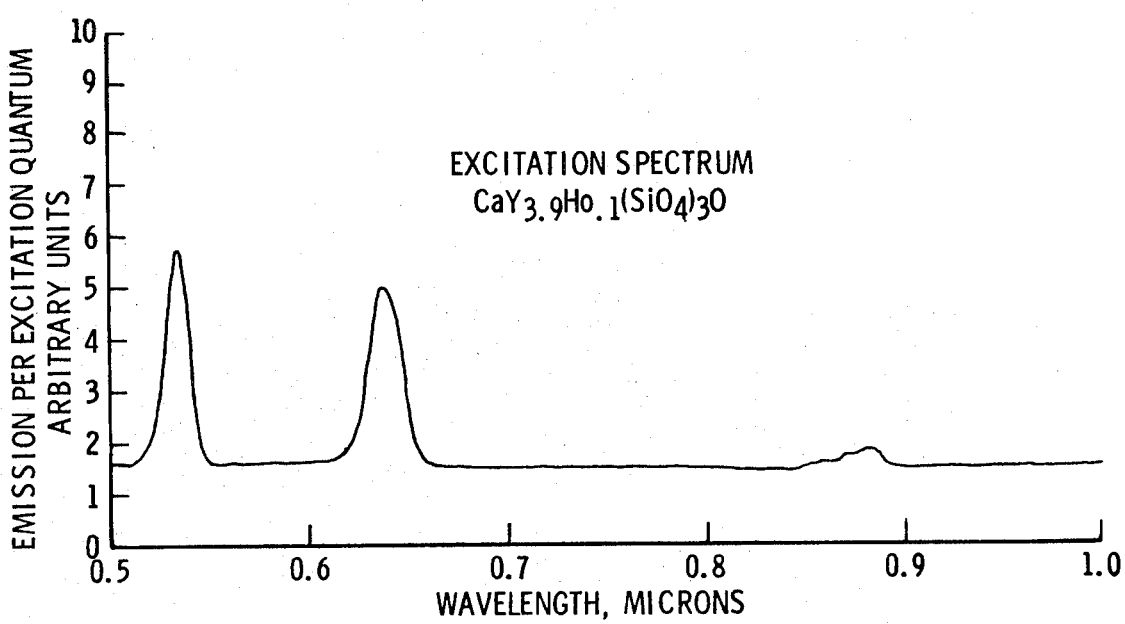
FIG. 5 shows the excitation spectrum of the infrared fluorescence from a polycrystalline sample of $$CaY_{3.9}Ho_{.1}(SiO_4)_3O$$

Spectroscopic data on the fluorescence and excitation of $CaY_{3.9}(SiO_4)_3O:Ho_{.1}$ and $CaY_{3.87}(SiO_4)_3O:Ho_{.1}$, $Cr_{.03}$ are shown in FIGS. 3 and 5. The presence of $Ho^{+3}$ produces an infrared fluorescence in the region of approximately 2.1 microns.

The absorption bands of $CaY_4(SiO_4)_3O$:Ho are improved by the addition of $Cr^{+3}$ as a sensitizer ion. $Cr^{+3}$ provides additional absorption bands such that energy absorbed in these bands is transferred to the $Ho^{+3}$ ions. This results in a great enhancement in the overall absorption bands which contribute to the $Ho^{+3}$ fluorescence emission. Our new laser material should have enhanced saturation-energy storage capabilities making it very promising for Q-switching applications.

FIGS. 5 and 6 show the excitation spectrum of $$CaY_{3.9}(SiO_4)_3O:Ho_{.1}$$

and $CaY_{3.87}(SiO_4)_3O$:$Ho_{.1}$, $Cr_{.03}$. As can be seen from a comparison of the figures, when $Cr^{+3}$ is added there appears in the excitation spectrum of $Ho^{+3}$ a broadband from 0.5 to 0.8 micron which is absent in the sample not containing $Cr^{+3}$. The presence of this excitation band is proof that $Cr^{+3}$ sensitizes $Ho^{+3}$ in this compound and this in conjunction with the other spectroscopic data indicate that the crystalline materials of this invention will make excellent laser crystals.

We claim:

1. A composition of matter comprising a silicate oxyapatite host having the formula $CaY_4(SiO_4)_3O$, said host containing the ion Ho in the ion concentration range of .02 to 20 atom percent of the calcium and yttrium cations in the host.

2. The composition of claim 1 wherein Ho has an ion concentration range of .02 to 6 atom percent.

3. A silicate oxyapatite laser crystal having the empirical formula $CaY_{4-x-y}(SiO_4)_3O$:$Ho_x$, $Cr_y$, wherein $x$ has a value between .001 and 1 and $y$ has a value between 0 and $(4-x)$.

References Cited

Ito-Silicate Apatites and Oxyapatites—53 American Mineralogist, pp. 894–895, June 1968. Copy in Patent Office Search Center.

ROBERT D. EDMONDS, Primary Examiner